L. H. LLOYD.
TIRE PROTECTOR.
APPLICATION FILED NOV. 24, 1916.

1,229,104.

Patented June 5, 1917.

Inventor
Lewis H. Lloyd,
by Wilkinson, Guiota
& MacKaye,
Attorneys

UNITED STATES PATENT OFFICE.

LEWIS HENRY LLOYD, OF BLOOMINGTON, ILLINOIS.

TIRE-PROTECTOR.

1,229,104.      Specification of Letters Patent.      Patented June 5, 1917.

Application filed November 24, 1916. Serial No. 133,222.

*To all whom it may concern:*

Be it known that I, LEWIS HENRY LLOYD, a citizen of the United States, residing at Bloomington, in the county of McLean and State of Illinois, have invented certain new and useful Improvements in Tire-Protectors; and I do hereby declare the following to be a full, clear, and exact description of the invention, such as will enable others skilled in the art to which it appertains to make and use the same.

The present invention relates to improvements in tire protectors, and more specifically consists in a circular sheath which is adapted to be fitted within the casing or shoe of the tire and between the same and the inner tube, such sheath being of puncture proof material so as to effectually protect the inflated inner tube.

In accordance with my present invention the sheath is built up of a series of arcuate sections of any suitable material and being of a width to extend only across the tread of the tire, there being inwardly disposed arms on said sections for embracing the sides of the inner tube in a manner to hold the sheath or protector against displacement from the tread portion of the tire.

With these and other objects in view the invention consists in the novel details of construction and combinations of parts more fully hereinafter disclosed and particularly pointed out in the claim.

In the accompanying drawings forming a part of this application, and in which similar reference symbols indicate corresponding parts in the several views.

Referring more particularly to the drawings, 1 designates the spokes of an automobile or other vehicle wheel, which spokes support the rim 2 in the usual manner. The rim in the present drawings is shown to be of the clencher type provided with the flanges 3 and 4; or the same may be of the demountable or other type, this being no part of my invention.

The tire casing or shoe is indicated at 5, it having the beads 6 and 7, which are held in place beneath the flanges 3 and 4 of the rim 2. At 8 is indicated the inner tube which is inflated in the usual manner.

Figure 1:
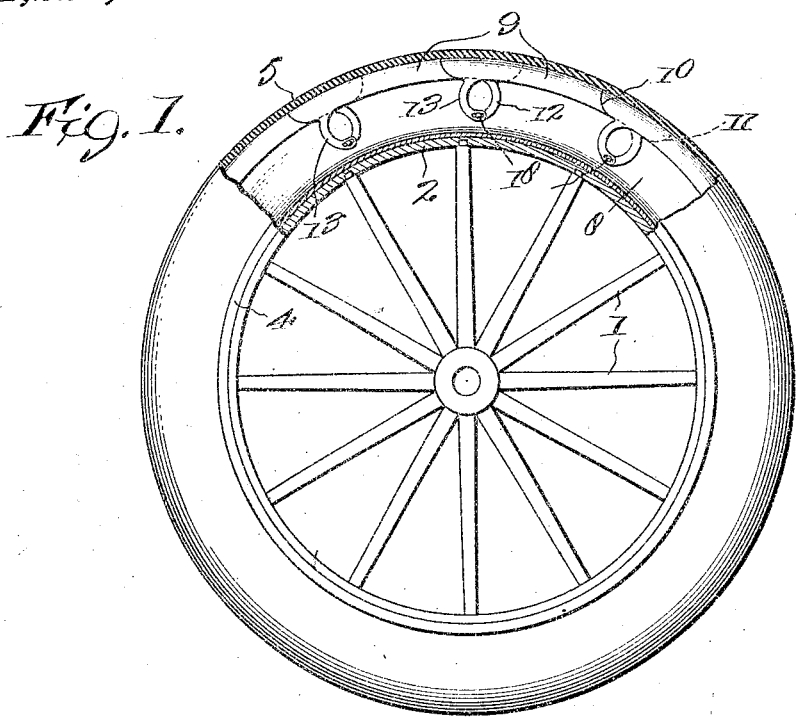
Figure 1 is a side elevational view, partly in section, of an automobile wheel illustrating my improved tire protector thereon.
Figure 2:
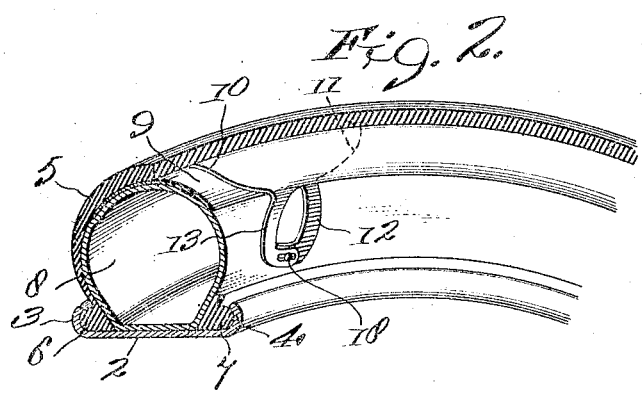
Fig. 2 is a fragmentary perspective view of the tire, partly in section and on an enlarged scale.

My invention consists in a sheath or protector that is to be removably fitted within the shoe 5, between the same and the inner tube 8, in a manner which is clearly illustrated in Figs. 1 and 2. This sheath or protector is built up of a series of similarly constructed sections 9, which sections may be of any suitable material, they being constructed preferably of some material that will be pliable or resilient. Thin sheet steel may be mentioned as one material of which the protector may be advantageously made, as the same affords sufficent resiliency to readily conform to the curvature of the inner wall of the shoe 5 when the inner tube 8 is inflated, and at the same time such sheet steel is not readily penetrable to nails or other sharp obstacles which are liable to be encountered on a roadway, and which are the usual cause of tire puncturing.

The protector sections 9 are preferably of a width to extend only over the tread portion of the tire, as clearly apparent from Fig. 2, as wider protectors, which extend about the sides of the tire, only decrease the resiliency of the tire and are apt to strike the rim of the wheel when the tire is in an abnormally deflated condition, thus breaking the protector or tearing the tire.

Figure 3:
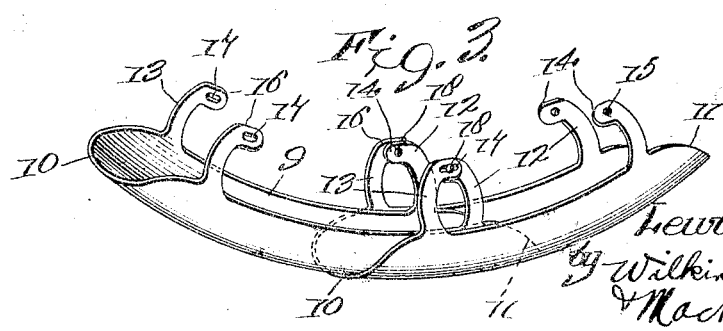
Fig. 3 is a perspective view illustrating two of the sections of the protector secured together.

In order not to pinch the inner tube 8, the sections 9 have a close sliding fit with one another, the ends of such sections being overlapped in the manner shown in Fig. 3, and having their transverse edges curved, as indicated at 10 and 11, by which construction there is presented no sharp corners or angles to the shoe 5 or inner tube 8. The sections 9 composing the tire protector are held in place on the tread portion of the tire by series of arms 12 and 13, which are provided in pairs at the opposite ends of each of the sections 9, such arms being curved in a direction of their width to conform to the side walls of the inner tube 8 and shoe 5 to embrace and clamp the former in such manner as will prevent displacement of the protector; such arms, however, terminating a sufficient distance from the rim 2 to avoid striking the latter when the tire is in a partially or wholly deflated condition. These arms 12 and 13 are also preferably edgewise curved so that they will not overlap and provide double thicknesses, but which allow the connected arms to lie in substantially the same plane.

The arms 12 terminate at their inner free ends in heads 14 formed with perforations 15, while the arms 13 carry similar heads 16 in which there are elongated slots 17. In the perforations 15 of the heads 14 are fitted rivets 18 projecting outwardly, and adapted to extend through the slots 17 formed in the heads 16 of the companion arms 13. It is through these rivets 18 that the arms are pivotally connected together, and when so connected they form a remote center for the adjacent sections 9 which they connect. The overlapping ends of the sections 9 will, by reason of such remote pivotal connection, freely slide in one another with the curved edges 10 and 11 in constant close contact with the walls of the adjacent sections, and will not pinch the inner tube 8.

The sections 9 are constructed individually of any suitable material, in any suitable manner, and are subsequently assembled by interfitting their edges and connecting their respective arms 12 and 13 by the rivets 18. After such sections 9 have been assembled in the requisite number to complete a continuous circle, the protector is then inserted within the shoe 5 and the inner tube 8 thereafter placed within such shoe and within the protector, it being then inflated. After inflation the inner tube will expand against the protector, holding it effectually against the inside of the tread portion of the shoe 5 and against the arms 12 and 13, which it will act to clamp and hold securely against displacement. When in this position, which is shown in Figs. 1 and 2, the sections 9 forming the sheath will afford an excellent protection for the inner tube 8, and will render the tire in which it is placed for all purposes substantially puncture proof.

It is obvious that those skilled in the art may vary the details of construction and arrangements of parts without departing from the spirit of my invention, and therefore I do not wish to be limited to such features except as may be required by the claim.

I claim:

The combination of a tire shoe, and an inflatable inner tube within said shoe, of a protecting sheath removably fitting within said tire shoe and between the interior of the tread portion of the same and the inner tube, said sheath comprising an interconnected series of arcuate metallic sections transversely curved to conform to the inside of the tire shoe and having rounded ends, said sections being assembled in overlapping relations, arms extending inwardly from said overlapping ends and being curved in both directions of their width and thickness, certain of said arms having slots therein, and pins carried on the companion arms and extending through said slots for connecting said sections, substantially as described.

In testimony whereof, I affix my signature.

LEWIS HENRY LLOYD.